(12) United States Patent
Kelnhofer

(10) Patent No.: US 9,284,057 B2
(45) Date of Patent: Mar. 15, 2016

(54) SYSTEM FOR COOLING A HEAT EXCHANGER ON BOARD AN AIRCRAFT

(75) Inventor: Juergen Kelnhofer, Jork (DE)

(73) Assignee: Airbus Operations GmbH, Hamburg (DE)

( * ) Notice: Subject to any disclaimer, the term of this patent is extended or adjusted under 35 U.S.C. 154(b) by 1176 days.

(21) Appl. No.: 13/125,728

(22) PCT Filed: Oct. 26, 2009

(86) PCT No.: PCT/EP2009/007647
§ 371 (c)(1),
(2), (4) Date: Jul. 25, 2011

(87) PCT Pub. No.: WO2010/051919
PCT Pub. Date: May 14, 2010

(65) Prior Publication Data
US 2011/0283713 A1 Nov. 24, 2011

Related U.S. Application Data

(60) Provisional application No. 61/111,375, filed on Nov. 5, 2008.

(30) Foreign Application Priority Data

Nov. 5, 2008 (DE) .......................... 10 2008 055 888

(51) Int. Cl.
*B64D 13/08* (2006.01)
*B64D 13/06* (2006.01)

(52) U.S. Cl.
CPC ................ *B64D 13/06* (2013.01); *B64D 13/08* (2013.01); *B64D 2013/0618* (2013.01); *Y02T 50/44* (2013.01); *Y02T 50/56* (2013.01)

(58) Field of Classification Search
CPC ............. F02C 6/08; F02C 9/18; B64D 13/06; B64D 13/08; B64D 2013/0618; B64D 2013/0648; B64D 2013/0688; F28D 2021/0021; F28D 2021/0026
USPC .................................... 60/795, 806, 782, 785
See application file for complete search history.

(56) References Cited

U.S. PATENT DOCUMENTS

| | | | |
|---|---|---|---|
| 2,944,987 | A | 7/1960 | Potter et al. |
| 3,208,234 | A | 9/1965 | Messinger |

(Continued)

FOREIGN PATENT DOCUMENTS

| | | |
|---|---|---|
| CN | 101005987 | 7/2007 |
| DE | 3824468 | 1/1990 |

(Continued)

OTHER PUBLICATIONS

English Machine Translation of Foreign Patent Document WO 2010051919 A1 to Kelnhofer Juergen, from Espacenet.*

(Continued)

*Primary Examiner* — Phutthiwat Wongwian
*Assistant Examiner* — Jason H Duger
(74) *Attorney, Agent, or Firm* — Wood, Herron & Evans, LLP

(57) ABSTRACT

A system for cooling a heat exchanger on board an aircraft includes an engine bleed air line connected to an engine of the aircraft and adapted to supply engine bleed air to the heat exchanger. The system further includes a process air line branching off from the engine bleed air line such that the engine bleed air is supplied to the process air line and connecting to an input side of a turbine. The system also includes a cooling air line connected to an output side of the turbine such that cooling air produced by an expansion of the engine bleed air supplied to the turbine is supplied to the cooling air line and then to the heat exchanger. The heat exchanger is adapted to transfer cooling energy from the cooling air to the engine bleed air supplied to the heat exchanger from the engine bleed air line.

9 Claims, 8 Drawing Sheets

(56) References Cited

U.S. PATENT DOCUMENTS

| | | | |
|---|---|---|---|
| 4,503,666 A * | 3/1985 | Christoff | 60/785 |
| 4,966,005 A | 10/1990 | Cowell et al. | |
| 4,991,394 A * | 2/1991 | Wright | 60/226.1 |
| 5,363,641 A * | 11/1994 | Dixon et al. | 60/778 |
| 5,373,707 A | 12/1994 | Ostersetzer et al. | |
| 5,392,595 A * | 2/1995 | Glickstein et al. | 60/780 |
| 5,414,992 A * | 5/1995 | Glickstein | 60/782 |
| 5,452,573 A * | 9/1995 | Glickstein et al. | 60/782 |
| 5,511,374 A * | 4/1996 | Glickstein et al. | 60/782 |
| 6,148,622 A | 11/2000 | Sanger | |
| 6,415,595 B1 | 7/2002 | Wilmot, Jr. et al. | |
| 6,427,471 B1 * | 8/2002 | Ando et al. | 62/402 |
| 6,526,775 B1 * | 3/2003 | Asfia et al. | 62/402 |
| 6,845,630 B2 * | 1/2005 | Bruno et al. | 62/323.3 |
| 7,300,494 B2 * | 11/2007 | Schwalm et al. | 95/54 |
| 7,305,842 B1 | 12/2007 | Schiff | |
| 2006/0059942 A1 | 3/2006 | McAuliffe et al. | |
| 2007/0267060 A1 | 11/2007 | Scherer et al. | |

FOREIGN PATENT DOCUMENTS

| | | | | |
|---|---|---|---|---|
| DE | WO 2010051919 A1 * | 5/2010 | | B64D 13/06 |
| WO | 9951492 | 10/1999 | | |
| WO | 0216743 | 2/2002 | | |

OTHER PUBLICATIONS

Chinese SIPO, Office Action for corresponding Chinese application (6 pgs.), along with English language summary of Office Action (1 pg.), Nov. 5, 2012.

European Patent Office, International Search Report, Form PCT/ISA/210 (4 pgs.), and Form PCT/ISA/237 (5 pgs.), Mar. 17, 2010.

* cited by examiner

Page 1

SYSTEM FOR COOLING A HEAT EXCHANGER ON BOARD AN AIRCRAFT

This application claims priority under Section 371 and/or as a continuation under Section 120 to PCT Application No. PCT/EP2009/007647, filed on Oct. 26, 2009, which claims priority to German Application No. 10 2008 055 888.5 and U.S. Provisional Application No. 61/111,375, both filed on Nov. 5, 2008.

TECHNICAL FIELD

The present invention relates to a system for cooling a heat exchanger on board an aircraft.

BACKGROUND

In modern commercial aircraft heat exchangers are installed in various systems, such as for example an aircraft air conditioning system, a de-icing system or cooling system for cooling thermally loaded equipment on board the aircraft. Depending on requirements, the heat exchangers may take the form of gas-gas heat exchangers, gas-liquid heat exchangers or liquid-liquid heat exchangers. Heat exchangers that are used to cool hot bleed air removed from the engine compressors or auxiliary engine compressors for further use in the aircraft air conditioning system or the de-icing system of the aircraft are currently cooled by engine cooling air removed from the engine, so-called "fan air". Alternatively, the heat exchangers, through which hot engine bleed air flows, may also be cooled by ambient air that flows through a cooling air duct. In order to convey the ambient air through the cooling air duct, hot engine bleed air may be directed via an injector nozzle into the cooling air duct. The jet pump effect produced by the injection of engine bleed air into the cooling air duct then ensures that sufficient ambient air is sucked into the cooling air duct and through the heat exchanger that is to be cooled.

Particularly in aircraft that are equipped with propeller engines there is the problem that no engine cooling air may be removed from the engines. The cooling of a heat exchanger, through which hot engine bleed air flows, then inevitably requires the use of a cooling duct, into which hot engine bleed air is injected through an injector nozzle in order to convey ambient air through the cooling air duct and through the heat exchanger that is to be cooled. The injection of highly compressed engine bleed air into a cooling duct may however lead to considerable noise emissions because of the expansion of the engine bleed air in the cooling duct. Furthermore, the removal of large quantities of heat from the heat exchanger, through which hot engine bleed air flows, requires a high cooling air-mass flow, which may be conveyed through the cooling duct only by the injection of a correspondingly high injection air-mass flow into the cooling duct. Finally, a cooling system, in which ambient air is conveyed through a cooling duct by the injection of engine bleed air into the cooling duct, has the drawback that the engine bleed air is utilized, not directly, but only indirectly for cooling purposes. This leads to losses in the energy efficiency of the system.

The invention is geared to the object of indicating a system for cooling a heat exchanger on board an aircraft that may be operated in an energy-efficient manner without the use of engine cooling air.

SUMMARY

To achieve this object, a system according to the invention for cooling a heat exchanger on board an aircraft comprises a process air line, a first end of which is connected to an engine of the aircraft in order to supply engine bleed air, i.e. air at an elevated pressure and at an elevated temperature, to the process air line. A second end of the process air line is connected to an input side of a turbine in order to supply the engine bleed air flowing through the process air line to the turbine. In the turbine the engine bleed air under elevated pressure is expanded and at the same time undergoes cooling. A first end of a cooling air line is therefore connected to an output side of the turbine in order to supply the cooling air line with cooling air that is produced by expansion of the engine bleed air in the turbine. The cooling air line is further adapted to supply the cooling air flowing through the cooling air line to the heat exchanger that is to be cooled. The cooling air line may be coupled in any desired manner thermally to the heat exchanger. The important point is merely that a proper transfer of cooling energy from the cooling air flowing through the cooling air line to the heat exchanger that is to be cooled is guaranteed. For example, the cooling air line may extend in a suitable form through the heat exchanger. The heat exchanger to be cooled may be a single heat exchanger or a multiple heat exchanger.

The cooling system according to the invention enables proper cooling of the heat exchanger provided on board the aircraft both during taxiing and cruising of the aircraft without the use of engine cooling air. The cooling system is therefore freely usable also in aircraft, which are equipped with propeller engines and in which it is not possible to tap engine cooling air. The cooling system is moreover operable with relatively low noise, with the result that the use of sound-insulating material, such as is necessary in the cooling systems of prior art, in which ambient air is conveyed through a cooling duct by the injection of engine bleed air into the cooling duct, may be avoided. This enables savings in cost and weight. A further advantage of the cooling system according to the invention is its simple construction. The cooling system may therefore, if necessary, be integrated in a relatively simple manner into a primary cooling system. Finally, the cooling system according to the invention takes up only relatively little installation space.

The process air line of the cooling system according to the invention may be connected directly to the engine of the aircraft. Alternatively, the process air line may however be connected by a further line or further lines or other components to the engine of the aircraft. For example, the process air line may branch off from an engine bleed air line, a first end of which is connected to the engine of the aircraft in order to supply engine bleed air to the engine bleed air line. The engine bleed air line may supply engine bleed air to other systems on board the aircraft, such as for example the aircraft air conditioning system or a de-icing system of the aircraft. Should this be necessary for further utilization of the engine bleed air for example in the previously mentioned aircraft systems, the engine bleed air line may supply the engine bleed air flowing through the engine bleed air line to a suitable cooling device. For example, the engine bleed air line may be adapted to convey the engine bleed air flowing through the engine bleed air line through the heat exchanger that is cooled by means of the cooling system according to the invention.

The process air line may branch off from the engine bleed air line, in relation to the direction of flow of the engine bleed air through the engine bleed air line, upstream of the heat exchanger to be cooled. Given such an arrangement, the engine bleed air may be supplied to the process air line and subsequently to the turbine without pressure- and temperature losses. However, should this be desirable or necessary, the process air line may branch off from the engine bleed air line, in relation to the direction of flow of the engine bleed air through the engine bleed air line, alternatively downstream of the heat exchanger.

The heat exchanger to be cooled may be cooled exclusively by means of the cooling air flowing through the cooling air line. However, the heat exchanger to be cooled may alternatively be disposed in a cooling duct, through which ambient air may flow. The cooling duct may be configured for example in the form of a ram-air duct. During cruising of the aircraft the heat exchanger may then be cooled by means of ambient air flowing through the cooling duct, whereas during taxiing of the aircraft cooling of the heat exchanger is possible by means of the cooling air flowing through the cooling air line. Given such an arrangement, at least during cruising of the aircraft a simultaneous cooling of the heat exchanger by means of ambient air and cooling air from the cooling air line may further be effected. In this way the cooling capacity of the cooling system according to the invention may be increased. Depending on the style of construction of the heat exchanger, the ambient air flowing through the cooling duct and the cooling air from the cooling air line may be conveyed as separate air flows through the heat exchanger. It is however alternatively conceivable to combine the ambient air flowing through the cooling duct and the cooling air from the cooling air line into a single air flow upstream or downstream of the heat exchanger. Such a development of the cooling system according to the invention may be realized for example by means of a cooling air line that opens into the cooling duct.

The system according to the invention for cooling a heat exchanger on board an aircraft preferably further comprises a compressor, which is driven by the turbine and adapted to take in and compress ambient air. For example, the turbine and the compressor may be configured in the form of a compressor/turbine unit and be disposed on a common shaft. The ambient air taken in and compressed by the compressor may be returned unused into the environment. Preferably, however, the compressed air produced by the compressor is supplied for further use. For example, the compressed air produced by the compressor may be supplied to other aircraft systems, such as for example the aircraft air conditioning system. An alternative or additional possibility is however the use of the compressed air produced by the compressor in the cooling system according to the invention.

For example, an input side of the compressor may be connected to an ambient air line in order to convey ambient air into the ambient air line, wherein the ambient air line may be adapted to supply the ambient air flowing through the ambient air line to the heat exchanger that is to be cooled. In other words, the compressor may be used to supply cooling ambient air, in addition to the cooling air from the cooling air line, to the heat exchanger. In this way, not only the cooling capacity but also the energy efficiency of the cooling system may be increased. The ambient air line may be coupled in any desired manner thermally to the heat exchanger. The important point is merely that a proper transfer of cooling energy from the ambient air flowing through the ambient air line to the heat exchanger that is to be cooled is guaranteed.

If the heat exchanger to be cooled is disposed in a cooling duct, through which ambient air may flow, the input side of the compressor may also be connected to the cooling duct in order to convey ambient air through the cooling duct. In other words, the ambient air line that is connected to the input side of the compressor may be formed partially or entirely by the cooling duct. It is alternatively conceivable to fashion the ambient air line and the cooling duct in such a way that the ambient air line or a portion of the ambient air line opens into the cooling duct, so that ambient air sucked from the environment through the ambient air line may be fed into the cooling duct.

In an alternative development of the cooling system according to the invention, an output side of the compressor is connected to a compressor air line in order to supply compressed compressor air to the compressor air line, wherein the compressor air line is adapted to supply the compressor air flowing through the compressor air line to the heat exchanger that is to be cooled. In this development of the cooling system according to the invention too, the compressor is used to supply additional cooling air to the heat exchanger. Thus, this form of implementation of the cooling system also allows an increase of the cooling capacity and the energy efficiency of the system. The compressor air line may be coupled in any desired manner thermally to the heat exchanger. The important point is merely that a proper transfer of cooling energy from the compressor air flowing through the compressor air line to the heat exchanger that is to be cooled is guaranteed.

The compressor air line may extend in the form of a separate line through the heat exchanger that is to be cooled. However, the compressor air line may alternatively open out into the cooling air line so that the compressor air flowing through the compressor air line and the cooling air flowing through the cooling air line may be directed in the form of a single air flow through the heat exchanger. If the heat exchanger is disposed in a cooling duct, through which ambient air may flow, the compressor air line or a portion of the compressor air line may also open into the cooling duct. Furthermore, the output side of the compressor may be connected directly to the cooling duct, so that the compressor air line may be formed partially or entirely by the cooling duct. Finally, the compressor may also be integrated into the cooling duct.

BRIEF DESCRIPTION OF THE DRAWINGS

Preferred forms of implementation of the system according to the invention for cooling a heat exchanger on board an aircraft are described in detail below with reference to the accompanying diagrammatic drawings, which show.

DETAILED DESCRIPTION

Figure 1:
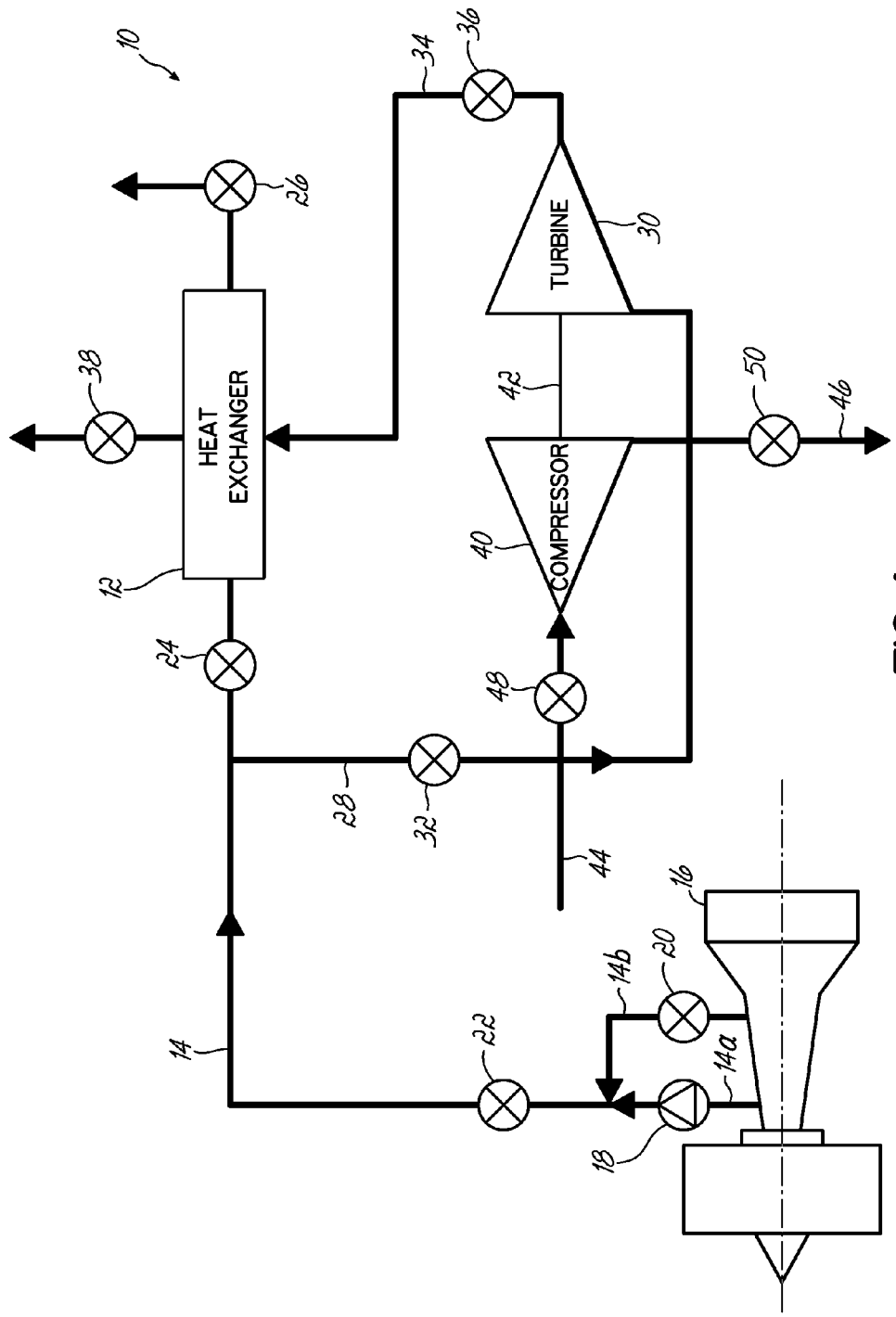
FIG. 1 a first form of implementation of a system for cooling a heat exchanger on board an aircraft, FIG. 2 a second form of implementation of a system for cooling a heat exchanger on board an aircraft, FIG. 3 a third form of implementation of a system for cooling a heat exchanger on board an aircraft, FIG. 4 a fourth form of implementation of a system for cooling a heat exchanger on board an aircraft, FIG. 5 a fifth form of implementation of a system for cooling a heat exchanger on board an aircraft, FIG. 6 a sixth form of implementation of a system for cooling a heat exchanger on board an aircraft, FIG. 7 a seventh form of implementation of a system for cooling a heat exchanger on board an aircraft and FIG. 8 an eighth form of implementation of a system for cooling a heat exchanger on board an aircraft.

A cooling system denoted by 10 in FIG. 1 is used to supply cooling energy to a heat exchanger 12 on board an aircraft. The heat exchanger 12 may take the form of a single- or multiple heat exchanger and through it flows hot engine bleed air, which is supplied to the heat exchanger 12 by an engine bleed air line 14. At its first end the engine bleed air line 14 comprises two engine bleed air line branches 14*a*, 14*b*. The engine bleed air line branches 14*a*, 14*b* are connected at different positions to an engine 16 of the aircraft. Hot engine bleed air removed from the engine 16 therefore flows through the engine bleed air line branches 14*a*, 14*b* into the engine bleed air line 14 and, from there, through the heat exchanger 12. After flowing through the heat exchanger 12, the engine bleed air is supplied to an aircraft air conditioning system (not shown in detail) and to a wing de-icing system (likewise not represented) of the aircraft.

The engine bleed air flowing through the engine bleed air line branch 14*b* has a higher system pressure than the engine bleed air that is removed from the engine 16 of the aircraft through the engine bleed air line branch 14*a*. In order to prevent the engine bleed air that is under a higher pressure from flowing out of the engine bleed air line branch 14*b* through the engine bleed air line branch 14*a* and back into the engine 16, a check valve 18 is disposed in the engine bleed air line branch 14*a*. The engine bleed air flow through the engine bleed air line branch 14*b*, on the other hand, is controlled by a control valve 20. Further control valves 22, 24 control the flow of the engine bleed air through the engine bleed air line 14 between a connection point of the engine bleed air line branches 14*a*, 14*b* and the heat exchanger 12. Finally, a further control valve 26 is disposed downstream of the heat exchanger 12 in the engine bleed air line 14 and controls the supply of engine bleed air into the aircraft air conditioning system and the wing de-icing system of the aircraft.

Upstream of the heat exchanger 12 a process air line 28 branches off from the engine bleed air line 14. A first end of the process air line 28 that is connected to the engine bleed air line 14 is therefore connected by the engine bleed air line 14 and the engine bleed air line branches 14*a*, 14*b* to the engine 16 of the aircraft, so that hot engine bleed air removed from the engine 16 flows through the process air line 28, just as it does through the engine bleed air line 14. A second end of the process air line 28 is connected to an input side of a turbine 30, so that hot, highly compressed engine bleed air is supplied through the process air line 28 to the turbine 30. Control of the engine bleed air flow through the process air line 28 is effected by means of a control valve 32, which is disposed upstream of the turbine 30 in the process air line 28.

The hot, highly compressed engine bleed air, as it flows through the turbine 30, is expanded and at the same time undergoes cooling. The expanded cooled engine bleed air is supplied as cooling air to a cooling air line 34, a first end of which is connected to an output side of the turbine 30. The cooling air line 34 in its further course is coupled thermally to the heat exchanger 12, so that the cooling energy of the cooling air flowing through the cooling air line 34 may be used to cool the heat exchanger 12. The thermal coupling between the cooling air line 34 and the heat exchanger 12 may be established in any desired suitable manner. For example, the cooling air line 34 may extend through the heat exchanger 12. Control of the cooling air flow through the cooling air line 34 between the output side of the turbine 30 and the heat exchanger 12 is effected with the aid of a control valve 36.

Downstream of the heat exchanger 12, i.e. after the cooling air flowing through the cooling air line 34 has transferred its cooling energy to the heat exchanger, i.e. to the hot engine bleed air from the engine bleed air line 14 flowing through the heat exchanger 12, the cooling air flowing through the cooling air line 34 is released into the environment. The release of cooling air into the environment is controlled with the aid of a control valve 38, which is disposed downstream of the heat exchanger 12 in the cooling air line 34.

The energy generated by the expansion of the hot, highly compressed engine bleed air in the turbine 30 is used to drive a compressor 40, which with the turbine 30 forms a compressor/turbine unit and is disposed with the turbine 30 on a common shaft 42. An input side of the compressor 40 is connected to an ambient air line 44, so that the compressor 40 during operation draws in ambient air through the ambient air line 44. In the compressor 40 the ambient air is compressed. An output side of the compressor 40 is connected to a compressor air line 46. The compressed compressor air flowing through the compressor air line 46 may be released unused into the environment. Alternatively, the compressor air from the compressor air line 46 may however be supplied to another system of the aircraft, for example to the aircraft air conditioning system or to another system that requires compressor air. Control of the ambient air flow through the ambient air line 44 is effected by means of a control valve 48, which is disposed in the ambient air line 44. In order to control the compressor air flow through the compressor air line 46 a control valve 50 is disposed in the compressor air line 46.

Figure 2:
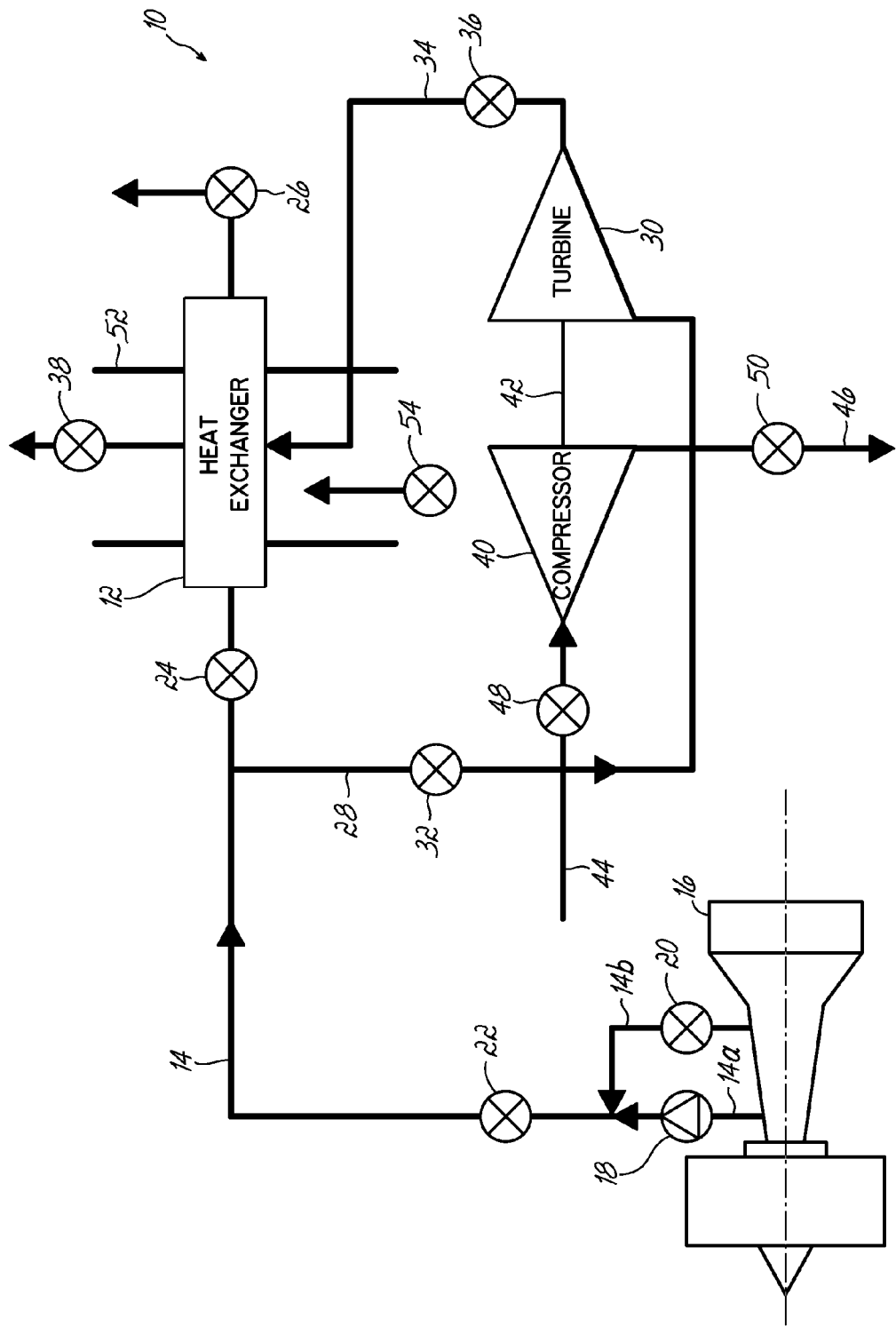

The cooling system 10 shown in FIG. 2 differs from the arrangement represented in FIG. 1 in that the heat exchanger 12 is disposed in a cooling duct 52. Ambient air flows through the cooling duct 52, which may be configured for example in the form of a ram-air duct. For controlling the ambient air flow through the cooling duct 52 a control valve 54 is provided. The control valve 54 may be configured for example in the form of a ram-air duct inlet flap.

During cruising of the aircraft, if the aircraft has a suitably high air speed, ambient air flows through the cooling duct 52 so that the heat exchanger 12 may be cooled exclusively by the cooling energy contained in the ambient air flowing through the cooling duct 52. Alternatively, during cruising of the aircraft cooling of the heat exchanger 12 is however possible also by means of a combination of ambient air flowing through the cooling duct 52 and cooling air from the cooling air line 34. Thus, during cruising of the aircraft by using the ambient air flowing through the cooling duct 52 and the cooling air from the cooling air line 34 to cool the heat exchanger 12 the cooling capacity of the system may be increased. If the heat exchanger 12 may also be cooled exclusively by means of the ambient air flowing through the cooling duct 52, it is possible to dispense with the removal of engine bleed air through the process air line 28. For this purpose, for example the control valve 32 may be closed. During taxiing of the aircraft, on the other hand, the cooling air from the cooling air line 34 ensures an adequate cooling of the heat exchanger 12.

The ambient air flowing through the cooling duct 52 and the cooling air from the cooling air line 34 may be directed as separate air flows through the heat exchanger 12 or be brought in some other way into thermal contact with the heat exchanger 12. The ambient air flowing through the cooling duct 52 and the cooling air from the cooling air line 34 may however alternatively be combined into a single air flow upstream or downstream of the heat exchanger. For this purpose, as is shown in FIG. 2, the cooling air line 34 may open out into the cooling duct 52. Otherwise the construction and the mode of operation of the cooling system 10 shown in FIG. 2 correspond to the construction and the mode of operation of the arrangement represented in FIG. 1.

Figure 3:
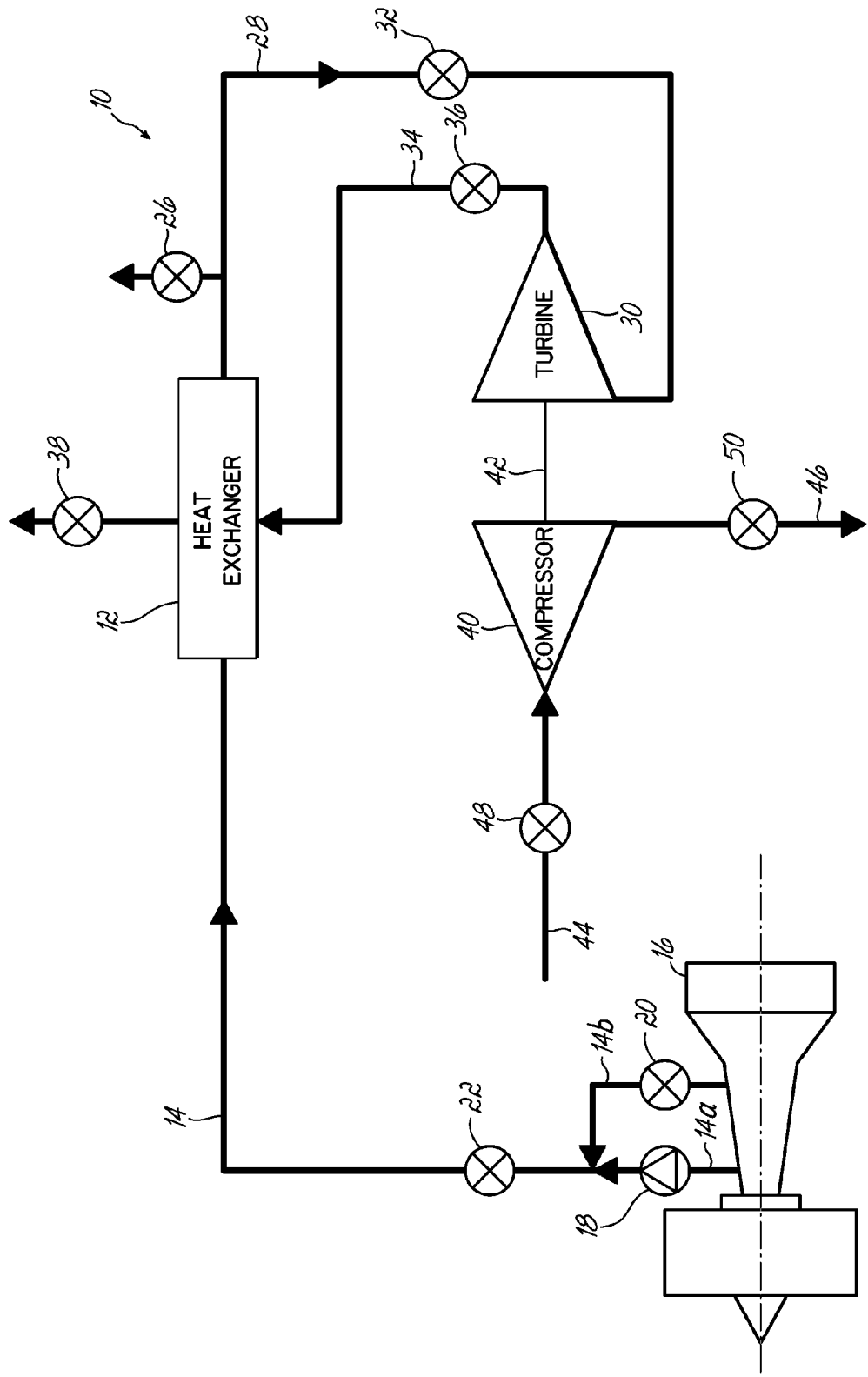

The cooling system 10 shown in FIG. 3 differs from the arrangement according to FIG. 1 in that the process air line 28 branches off from the engine bleed air line 14, not upstream, but downstream of the heat exchanger 12. Otherwise the construction and the mode of operation of the cooling system 10 according to FIG. 3 correspond to the construction and the mode of operation of the system represented in FIG. 1.

Figure 4:
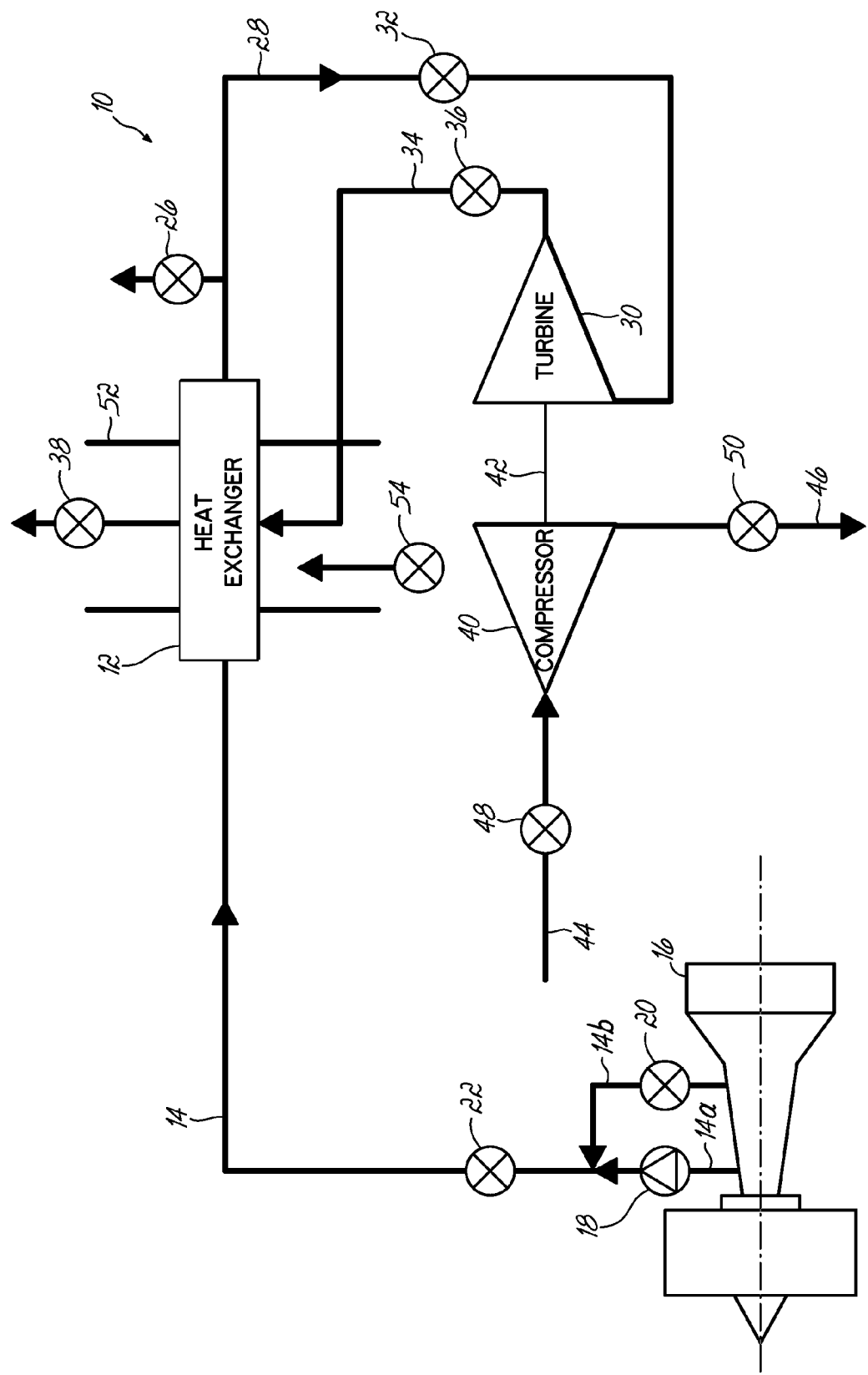

In a similar manner the cooling system 10 shown in FIG. 4 differs from the system according to FIG. 2 in that the process air line 28 branches off from the engine bleed air line 14, not upstream, but downstream of the heat exchanger 12. Otherwise the construction and the mode of operation of the cooling system 10 shown in FIG. 4 correspond to the construction and the mode of operation of the arrangement according to FIG. 2.

Figure 5:
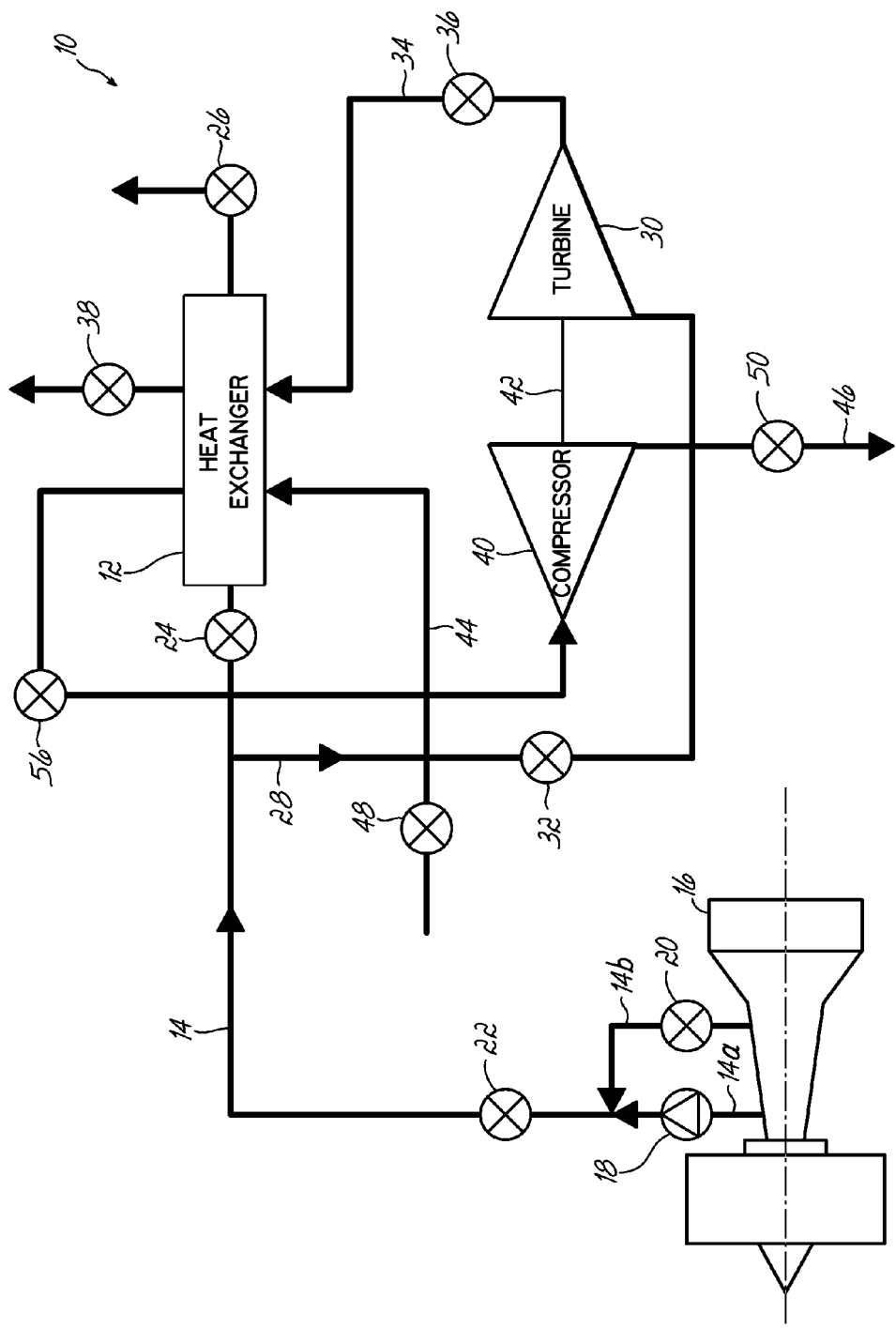

FIG. 5 shows a cooling system 10 that differs from the system according to FIG. 1 in that the ambient air line 44 connected to the input side of the compressor 40 is coupled thermally to the heat exchanger 12. The cooling energy that is contained in the ambient air drawn through the ambient air line 44 by the compressor 40 may therefore be used to cool the heat exchanger 12. The use of the output of the compressor 40 to provide additional cooling energy for the heat exchanger 12 makes it possible to increase of the cooling capacity of the cooling system 10 in an energy-efficient manner. For controlling the ambient air flow through the ambient air line 44 a further control valve 56 is provided in the ambient air line between the heat exchanger 12 and the input side of the compressor 40. Otherwise, the construction and the mode of operation of the cooling system 10 shown in FIG. 5 correspond to the construction and the mode of operation of the arrangement according to FIG. 1.

Figure 6:
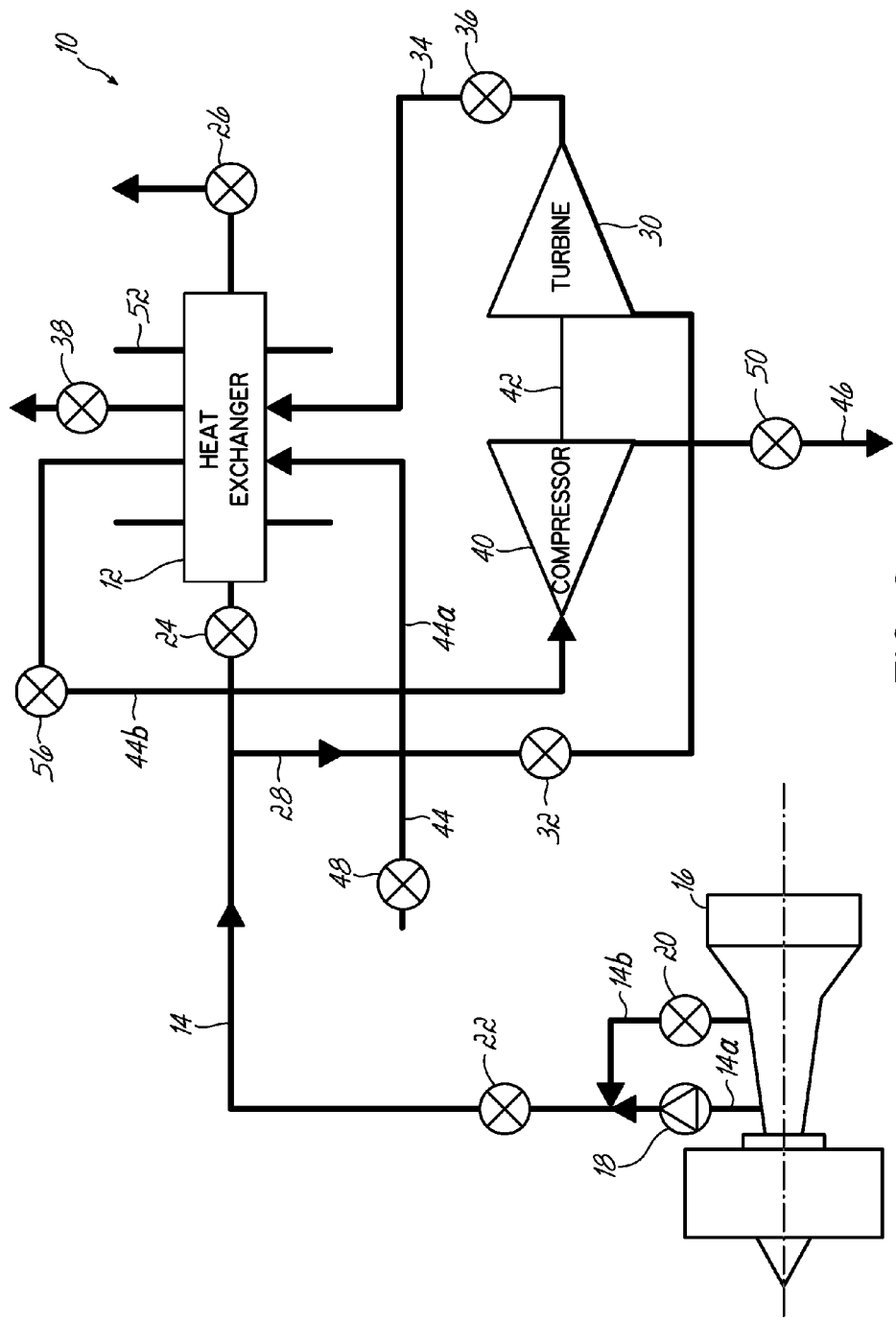

FIG. 6 shows a cooling system 10 that differs from the system according to FIG. 5 in that the heat exchanger 12 is disposed in a cooling duct 52 and that the ambient air line 44, through which the compressor 40 draws in ambient air, comprises a first portion 44a that opens out into the cooling duct 52 as well as a second portion 44b that connects the cooling duct 52 to the input side of the compressor 40. The compressor 40 therefore draws in ambient air through the cooling duct 52. Otherwise, the construction and the mode of operation of the cooling system 10 according to FIG. 6 correspond to the construction and the mode of operation of the arrangement represented in FIG. 5.

Figure 7:
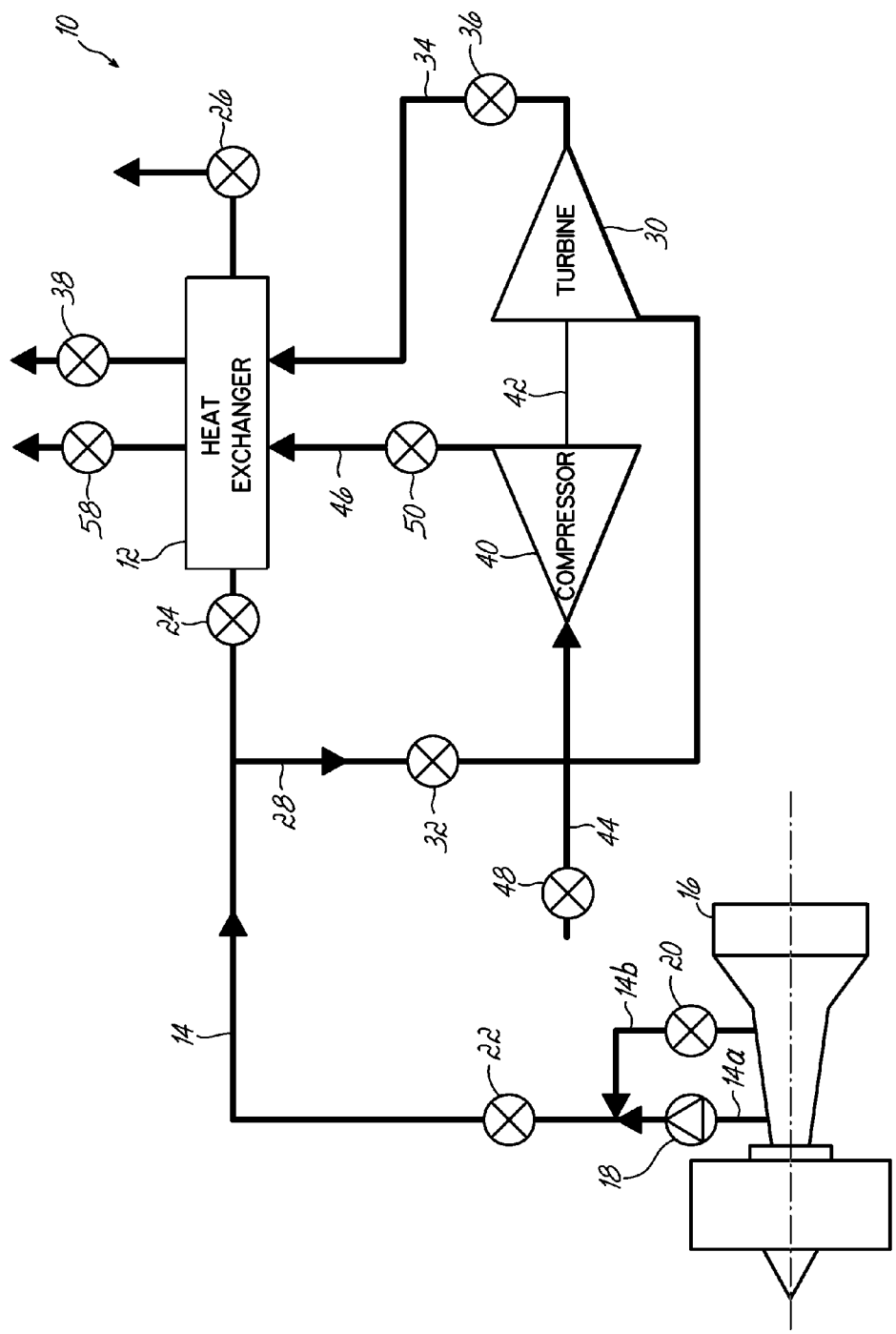
Figure 8:
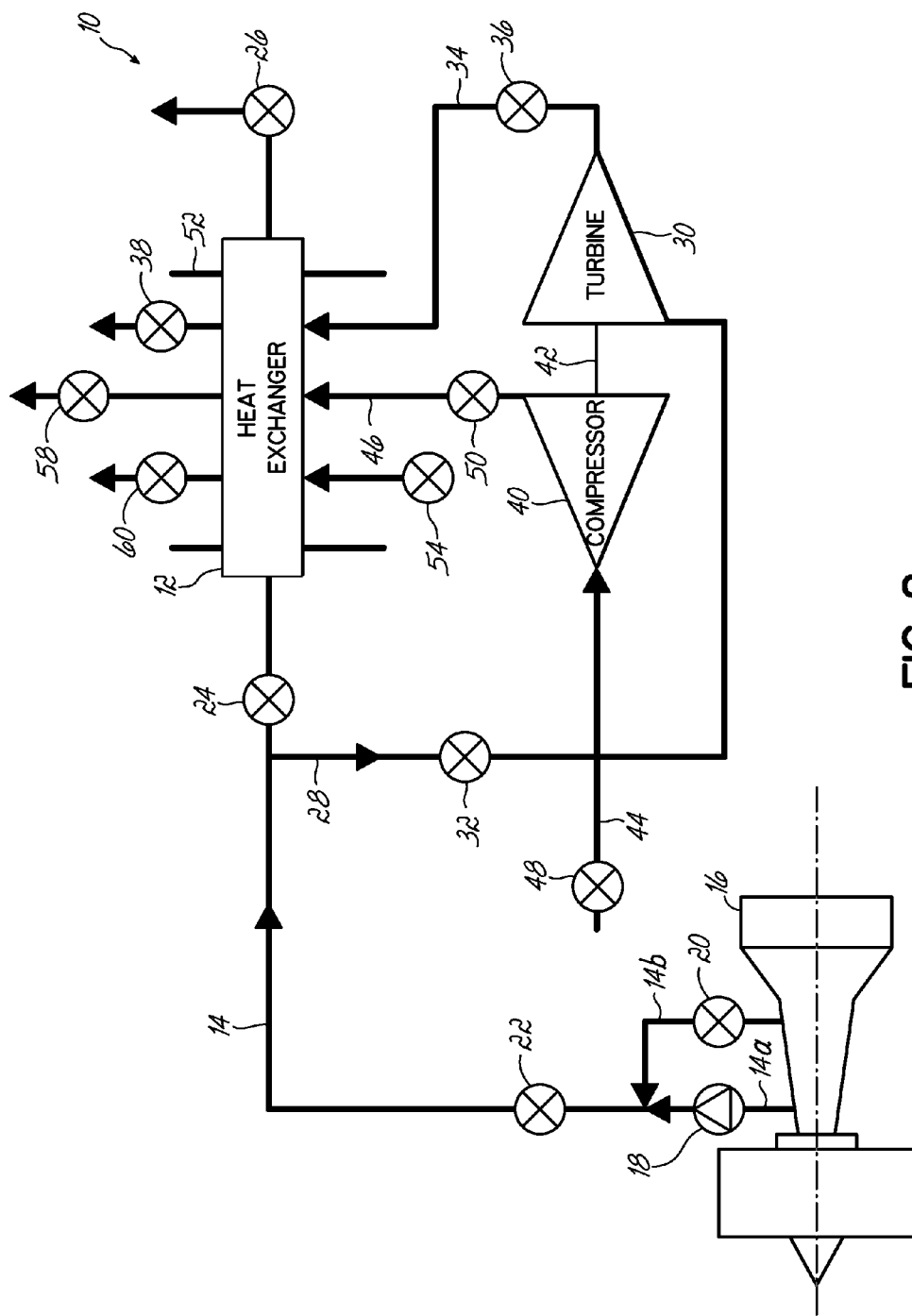

FIG. 7 shows a cooling system 10 that differs from the system according to FIG. 1 in that the compressor air line 46 connected to the output side of the compressor 40 is coupled thermally to the heat exchanger 12. In other words, the compressor air line 46 supplies the compressed compressor air flowing through the compressor air line 46 for cooling purposes to the heat exchanger 12. After flowing through the heat exchanger 12 the compressor air from the compressor air line 46, like the cooling air from the cooling air line 34, is released into the environment. For controlling the release of the compressor air from the compressor air line 46 a control valve 58 is provided. In the arrangement shown in FIG. 7 the compressor air from the compressor air line 46 and the cooling air from the cooling air line 34 are directed as separate air flows through the heat exchanger 12 and released downstream of the heat exchanger 12 into the environment. Alternatively, the compressor air from the compressor air line 46 and the cooling air from the cooling air line 34 may be combined into a single air flow upstream or downstream of the heat exchanger 12. Finally, FIG. 8 shows a cooling system 10 that differs from the arrangement according to FIG. 7 in that the heat exchanger 12 is disposed in a cooling duct 52. The heat exchanger 12 may therefore be cooled by means of cooling air from the cooling air line 34, compressor air from the compressor air line 46 and ambient air flowing through the cooling duct 52. Control of the return of the ambient air flowing through the cooling duct 52 into the environment downstream of the heat exchanger 12 is effected by means of a control valve 60. The cooling air from the cooling air line 34, the compressor air from the compressor air line 46 and the ambient air flowing through the cooling air duct 52 may once more be directed as separate air flows through the heat exchanger 12. However, some or all of the air flows may alternatively be combined into a single air flow upstream or downstream of the heat exchanger 12.

The control valves 20 to 26, 32, 36, 37 38, 48, 50 and 54 to 58 may be controlled by an electronic control unit. Alternatively, a plurality of electronic control units may be provided for controlling the valves 20 to 26, 32, 36, 38, 48, 50 and 54 to 58. Furthermore, depending on the application requirements it is possible to dispense with some or all of the valves. The cooling systems 10 shown in FIGS. 5 to 8 may moreover also be modified such that the process air line 28 branches off from the engine bleed air line 14, not upstream, but downstream of the heat exchanger 12. The compressor 40 may moreover be integrated into the cooling duct 52.

The invention claimed is:

1. A system for cooling a heat exchanger on board an aircraft comprising:

an engine bleed air line including a first end and a second end, the first end of the engine bleed air line being connected by a plurality of engine bleed air line branches to an engine of the aircraft at a plurality of positions such that engine bleed air is supplied to the engine bleed air line, the engine of the aircraft generating propulsion force to move the aircraft, wherein the heat exchanger is attached to the engine bleed air line between the first end and the second end of the engine bleed air line, and the engine bleed air line is adapted to supply a first portion of the engine bleed air to the heat exchanger;

a process air line including a first end and a second end, the first end of the process air line branching off from the engine bleed air line upstream of the heat exchanger such that a second portion of the engine bleed air supplied to the engine bleed air line is supplied to the process air line, and the second end of the process air line being attached to an input side of a turbine such that the second portion of the engine bleed air is supplied to the turbine; and a cooling air line including a first end and a second end, the first end of the cooling air line being attached to an output side of the turbine such that a flow of cooling air produced by an expansion of the second portion of the engine bleed air supplied to the turbine is supplied to the cooling air line, and the second end of the cooling air line being attached to the heat exchanger, wherein the heat exchanger is adapted to transfer energy between the flow of cooling air and the first portion of the engine bleed air supplied to the heat exchanger, thereby cooling the first portion of the engine bleed air, wherein the heat exchanger to be cooled is also positioned in a cooling duct connected to a source of ambient air so as to allow the heat exchanger to be flown through by a first flow of ambient air, to thereby transfer energy between the first flow of ambient air and the first portion of the engine bleed air, thereby cooling the first portion of the engine bleed air, wherein the cooling duct is separate from the engine, the cooling duct being positioned between the first end and the second end of the engine bleed air line, and the engine bleed air line passing through the heat exchanger and the cooling duct, such that the first portion of the engine bleed air is adapted to flow through the heat exchanger and the cooling duct within the engine bleed air line.

2. The system according to claim 1, wherein the process air line branches off from the engine bleed air line in a direction of flow of the engine bleed air through the engine bleed air line.

3. The system according to claim 1, wherein the cooling duct includes an inlet control valve that controls the amount of ambient air flowing to the heat exchanger.

4. The system according to claim 1, further comprising:
a compressor driven by the turbine and adapted to draw in and compress a second flow of ambient air, the compressor being separate from the engine of the aircraft.

5. The system according to claim 4, further comprising:
an ambient air line connected to an input side of the compressor such that the second flow of ambient air is supplied to the ambient air line and is subsequently supplied to the input side of the compressor, wherein the ambient air line is adapted to supply the second flow of ambient air to the heat exchanger before being supplied to the input side of the compressor.

6. The system according to claim 5, wherein the ambient air line includes a portion that opens into the cooling duct and/or the ambient air line is formed at least partially by the cooling duct.

7. The system according to claim 4, further comprising:
a compressor air line connected to an output side of the compressor such that compressed compressor air is supplied to the compressor air line from the compressor, and then to the heat exchanger.

8. The system according to claim 7, wherein the compressor air line includes a portion that opens into the cooling duct and/or is formed at least partially by the cooling duct.

9. The system according to claim 1, wherein the first portion of the engine bleed air is directly supplied to the heat exchanger.

* * * * *